(12) United States Patent
Salahieh et al.

(10) Patent No.: US 11,722,653 B2
(45) Date of Patent: *Aug. 8, 2023

(54) MULTI-PASS ADD-ON TOOL FOR COHERENT AND COMPLETE VIEW SYNTHESIS

(71) Applicant: Intel Corporation, Santa Clara, CA (US)

(72) Inventors: Basel Salahieh, Santa Clara, CA (US); Sumit Bhatia, Folsom, CA (US); Jill Boyce, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 17/217,588

(22) Filed: Mar. 30, 2021

(65) Prior Publication Data

US 2021/0329220 A1 Oct. 21, 2021

Related U.S. Application Data

(63) Continuation of application No. 16/456,197, filed on Jun. 28, 2019, now Pat. No. 10,965,932.

(Continued)

(51) Int. Cl.
*H04N 13/282* (2018.01)
*H04N 19/597* (2014.01)
(Continued)

(52) U.S. Cl.
CPC ............ *H04N 13/282* (2018.05); *G06T 5/50* (2013.01); *G06T 7/593* (2017.01); *H04N 13/156* (2018.05);
(Continued)

(58) Field of Classification Search
CPC .. H04N 13/282; H04N 19/597; H04N 13/156; H04N 13/351; H04N 13/161; G06T 7/593; G06T 5/50; G06T 2207/20221
See application file for complete search history.

(56) References Cited

U.S. PATENT DOCUMENTS 6,611,268 B1 * 8/2003 Szeliski .................. G06T 7/215
  348/700
8,345,956 B2 * 1/2013 Ward ...................... G06T 7/579
  382/173

(Continued)

FOREIGN PATENT DOCUMENTS

GB 2556910 6/2018

OTHER PUBLICATIONS

United States Patent and Trademark Office, "Notice of Allowance," mailed in connection with U.S. Appl. No. 16/456,197, dated Dec. 9, 2020, 9 pages.

(Continued)

*Primary Examiner* — Utpal D Shah
(74) *Attorney, Agent, or Firm* — Hanley, Flight & Zimmerman, LLC

(57) ABSTRACT

An embodiment of an image processor for immersive video includes technology to re-order patches from a plurality of views based on one or more of relative position and orientation related information for a desired synthesized view, select a set of views to be used in each view synthesis pass, perform two or more view synthesis passes for the synthesized view to provide two or more intermediate view synthesis results, and mask and merge the two or more intermediate view synthesis results to provide a final view synthesis result. Other embodiments are disclosed and claimed.

21 Claims, 9 Drawing Sheets

Related U.S. Application Data

(60) Provisional application No. 62/820,758, filed on Mar. 19, 2019.

(51) Int. Cl.
  *H04N 13/351* (2018.01)
  *G06T 7/593* (2017.01)
  *G06T 5/50* (2006.01)
  *H04N 13/156* (2018.01)
  *H04N 13/161* (2018.01)

(52) U.S. Cl.
  CPC ......... *H04N 13/161* (2018.05); *H04N 13/351* (2018.05); *H04N 19/597* (2014.11); *G06T 2207/20221* (2013.01)

(56) References Cited

U.S. PATENT DOCUMENTS

| | | | |
|---|---|---|---|
| 9,875,543 B2 | 1/2018 | Ma et al. | |
| 10,965,932 B2 | 3/2021 | Salahieh et al. | |
| 2006/0181610 A1* | 8/2006 | Carlsson | H04N 5/2628 |
| | | | 348/E5.053 |
| 2010/0026712 A1* | 2/2010 | Aliprandi | G06T 15/20 |
| | | | 345/629 |
| 2012/0050494 A1* | 3/2012 | Chen | G06T 15/205 |
| | | | 348/48 |
| 2012/0081519 A1* | 4/2012 | Goma | H04N 13/161 |
| | | | 348/47 |
| 2014/0098100 A1* | 4/2014 | Dane | H04N 13/302 |
| | | | 345/427 |
| 2015/0269737 A1* | 9/2015 | Lam | H04N 13/111 |
| | | | 382/154 |
| 2015/0346832 A1* | 12/2015 | Cole | H04N 19/39 |
| | | | 345/156 |
| 2017/0347084 A1* | 11/2017 | Boyce | H04N 19/17 |
| 2017/0347804 A1 | 11/2017 | Boyce | |
| 2019/0045168 A1* | 2/2019 | Chaudhuri | G06T 7/55 |
| 2019/0320164 A1 | 10/2019 | Salahieh et al. | |
| 2019/0385277 A1* | 12/2019 | Hutchinson | G06T 7/33 |
| 2020/0357128 A1* | 11/2020 | McCombe | G06T 7/73 |

OTHER PUBLICATIONS

Snyder, et al., "An album of map projections," U.S. Government Printing Office, Washington, 1989, 262 pages.

Mei et al., "On Building an Accurate Stereo Matching System on Graphics Hardware," IEEE International Conference on Computer Vision Workshops, Nov. 2011, 8 pages.

Jylanki, "A Thousand Ways to Pack the Bin—A Practical Approach to Two-Dimensional Rectangle Bin Packing," Dissertation, Feb. 27, 2010, 50 pages.

Hirschmuller, "Accurate and Efficient Stereo Processing by Semi-Global Matching and Mutual Information," IEEE Conference on Computer Vision and Pattern Recognition, 2005, 8 pages.

HDR Tools, "Files—0.18-dev—standards / HDRTools—GitLab," retrieved from https://gitlab.com/standards/HDRTools/tree/o.18-dev on Jun. 7, 2019, 1 page.

Fusiello et al., "A Compact Algorithm for Rectification of Stereo Pairs", Machine Vision and Applications manuscript, vol. 12.1, Mar. 2, 2000, 6 pages.

* cited by examiner

MULTI-PASS ADD-ON TOOL FOR COHERENT AND COMPLETE VIEW SYNTHESIS

CROSS-REFERENCE TO RELATED APPLICATIONS

This patent arises from a continuation of U.S. patent application Ser. No. 16/456,197, filed Jun. 28, 2019, entitled "MULTI-PASS ADD-ON TOOL FOR COHERENT AND COMPLETE VIEW SYNTHESIS," which claims the benefit of U.S. Provisional Patent Application Ser. No. 62/820,758, filed Mar. 19, 2019, entitled "HYBRID MULTI-PASS ADD-ON TOOL FOR COHERENT AND COMPLETE VIEW SYNTHESIS OF NATURAL CONTENT." The contents of these applications are hereby incorporated herein by reference in their entireties.

BACKGROUND

Arrays of cameras such as two or more linearly or grid aligned cameras are becoming increasingly common in a variety of device implementations such as tablet devices, smartphone devices, laptop devices, display devices, telepresence systems, and filmmaking and video production systems. For synthetic computer graphics content, discrete virtual camera arrays can be used to sample it. In the context of a viewing experience generated by such camera arrays, intermediate virtual views between camera locations are generated and provided to a user for display.

In some contexts, majority view synthesis techniques rely on texture and depth content of other views in order to synthesize a novel view therebetween. In the case of natural content (i.e., content captured by cameras), the associated depth maps are estimated from the captured texture content itself. Most depth estimation techniques use neighboring views (i.e., 2 or more views) to find disparities (i.e., relative shifts of correspondent pixels in different views). However, since the estimation is done locally, the resultant depth maps tend to lack coherency across all views, which becomes problematic when the capturing system is of many cameras with large baselines (i.e., spacing between the cameras).

This lack of coherency in depth maps results in artifacts (especially in the occluded regions) when utilizing all available views for the synthesis. In other words, when projecting all views to create 3D content using incoherent depth maps, the corresponding voxels are not aligned in the same depth planes resulting in many artifacts during back-projection to the desired synthesized view. Furthermore in multi-view coding schemes that deploy intermediate view synthesis to stream key views only, the artifacts coming from an incoherent depth content cause low compression efficiency as the encoder has difficulty finding the right motion vectors and matched blocks. This in turn results in more bandwidth utilization since the multi-views redundancy cannot be exploited.

In the case of synthetic content (i.e., content sampled by virtual cameras), the depth maps generated are ideal however they may reflect sharp transition in depth values for edge regions resulting in halo artifacts when rendering using all available views.

It is with respect to these and other considerations that the present improvements have been needed. Such improvements may become critical as the desire to collect and display such images or videos in camera array implementations and other contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
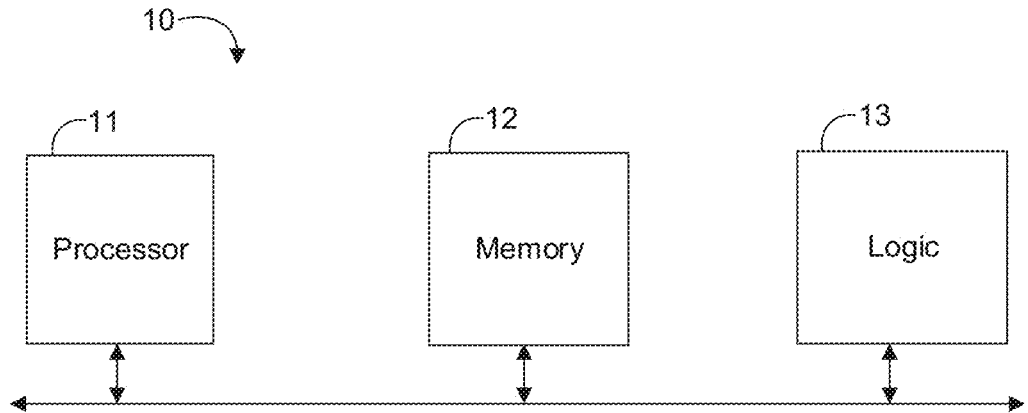
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to a multi-pass add-on tool for coherent and complete view synthesis.

The term "patch" referred to in this document may refer to a rectangular region within an atlas that corresponds to a rectangular region within a view and it could be also the whole view. The term "atlas" referred to in this document may refer to one patch or a collection of patches that is formed during an immersive/multi-view coding stage.

With reference to FIG. 1, an embodiment of an electronic system 10 may include memory 12 to store a plurality of views, a processor 11 communicatively coupled to the memory 12, and logic 13 communicatively coupled to the processor 11 and the memory 12. The logic 13 may be configured to re-order the plurality of patches from views based on one or more of relative position and orientation related information for the plurality of views with respect to the desired synthesized view, perform two or more view synthesis passes to provide two or more intermediate synthesized views, and mask and merge the two or more intermediate synthesized views to provide a final view synthesis result. In some embodiments, the logic 13 may be configured to re-order the plurality of views based on a distance between each view and a desired synthesized view. For example, the logic 13 may be configured to determine overlapped scene coverage information between the plurality of scenes and the desired synthesized view based on the one or more of relative position and orientation related information, and re-order the plurality of views in an order from a relatively largest overlap to a relatively smallest overlap based on the determined overlapped scene coverage information.

In some embodiments, the logic 13 may be further configured to perform two or more of the view synthesis passes in parallel with each other, and/or to determine one or more of a number of passes and a number of views for the performed view synthesis based on one or more user-provided parameters. In some embodiments, the logic 13 may be configured to generate a binary mask to identify missing information (e.g., holes, boundaries, occlusions, etc.) in an intermediate view. For example, the logic 13 may be configured to merge two intermediate synthesized views based on an overlap between the two intermediate synthesized views and the binary mask.

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the processor 11 may include a general purpose processor, a special purpose processor, a central processor unit (CPU), a graphic processor, a general purpose controller, an execution unit, a special purpose controller, a general purpose controller, a microcontroller, etc.

In some embodiments, the logic 13, may be located in, or co-located with, various components, including the processor 11 (e.g., on a same die). For example, the logic 13 may be implemented on a semiconductor apparatus which may include one or more substrates, with the logic 13 coupled to the one or more substrates. In some embodiments, the logic 13 may be at least partly implemented in one or more of configurable logic and fixed-functionality hardware logic on semiconductor substrate(s) (e.g., silicon, sapphire, gallium-arsenide, etc.). For example, the logic 13 may include a transistor array and/or other integrated circuit components coupled to the substrate(s) with transistor channel regions that are positioned within the substrate(s). The interface between the logic 13 and the substrate(s) may not be an abrupt junction. The logic 13 may also be considered to include an epitaxial layer that is grown on an initial wafer of the substrate(s).

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, firmware memory, persistent storage media, or other system memory may store a set of instructions which when executed by the processor 11 cause the system 10 to implement one or more components, features, or aspects of the system 10 (e.g., the logic 13, re-ordering the views, perform multiple view synthesis passes, and masking and merging the intermediate results to provide a final result, etc.).

Figure 2A:
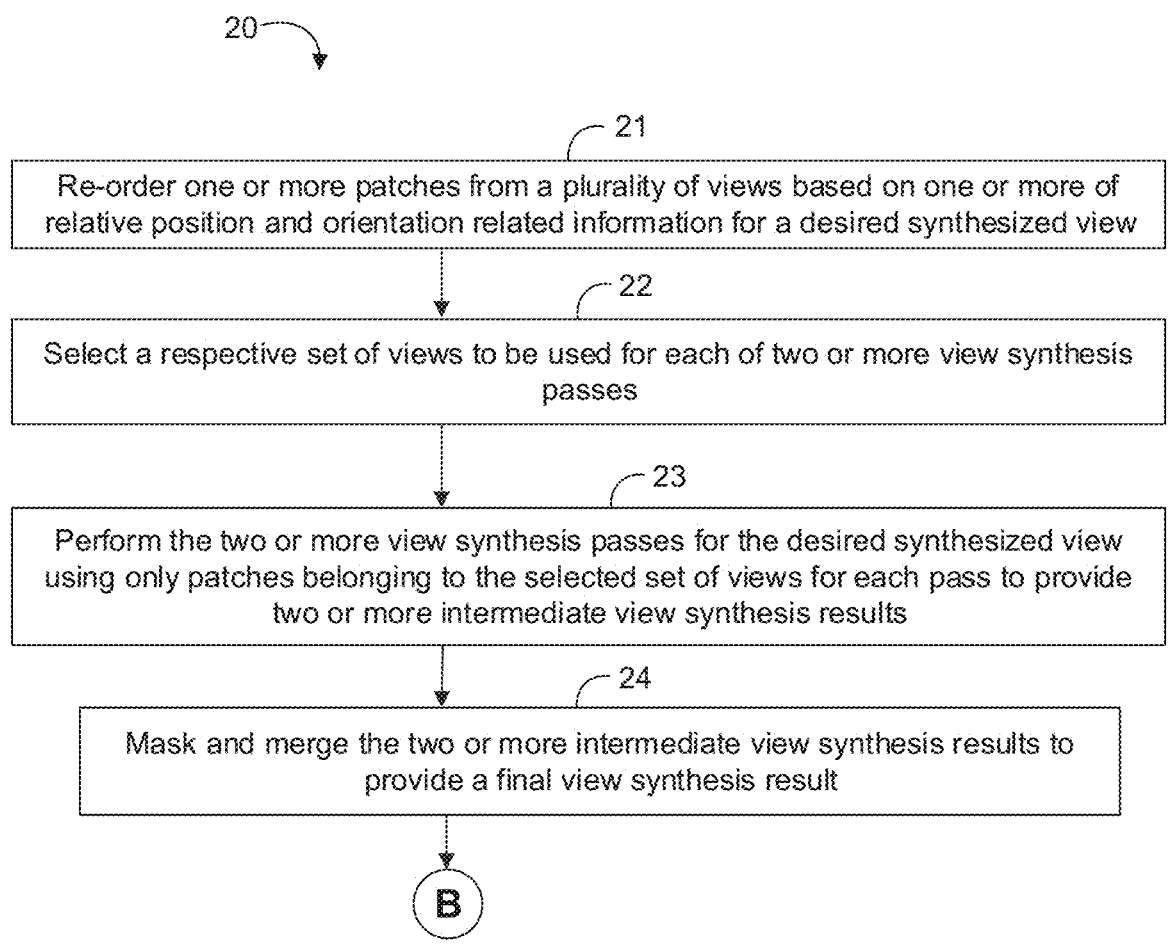
FIGS. 2A to 2B are flowcharts of an example of a method of processing an image according to an embodiment.
Figure 2B:
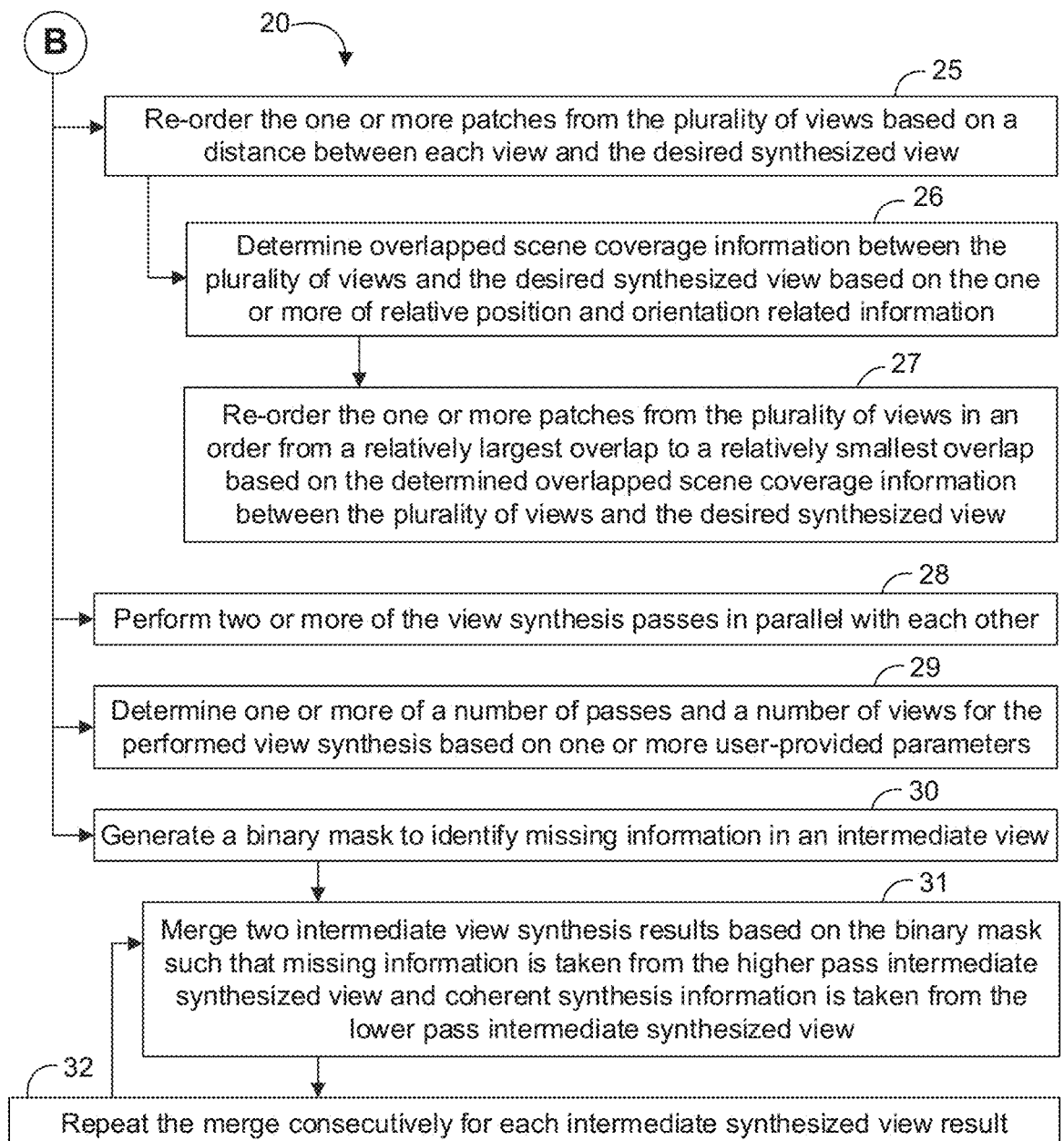

Turning now to FIGS. 2A to 2B, an embodiment of a method 20 of processing an image may include re-ordering one or more patches from a plurality of views based on one or more of relative position and orientation related information for a desired synthesized view at block 21, selecting a respective set of views to be used for each of two or more view synthesis passes at block 22, performing the two or more view synthesis passes for the desired synthesized view using only patches belonging to the selected set of views for each pass to provide two or more intermediate view synthesis results at block 23, and masking and merging the two or more intermediate view synthesis results to provide a final view synthesis result at block 24. Some embodiments of the method 20 may further include re-ordering the one or more patches from the plurality of views based on a distance between each view and the desired synthesized view at block 25. For example, the method 20 may include determining overlapped scene coverage information between the plurality of views and the desired synthesized view based on the one or more of relative position and orientation related information at block 26, and re-ordering the one or more patches from the plurality of views in an order from a relatively largest overlap to a relatively smallest overlap based on the determined overlapped scene coverage information between the plurality of views and the desired synthesized view at block 27.

Some embodiments of the method 20 may further include performing two or more of the view synthesis passes in parallel with each other at block 28, and/or determining one or more of a number of passes and a number of views for the performed view synthesis based on one or more user-provided parameters at block 29. Some embodiments of the method 20 may also include generating a binary mask to identify missing information in an intermediate view at block 30. For example, the method 20 may include merging two intermediate view synthesis results based on the binary mask such that missing information is taken from the higher pass intermediate synthesized view and coherent synthesis information is taken from the lower pass intermediate synthesized view at block 31, and repeating the merge consecutively for each intermediate synthesized view result at block 32.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 20 may be implemented on a computer readable medium as described in connection with Examples 15 to 21 below. Embodiments or portions of the method 20 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

The multi-pass techniques discussed herein combine coherent synthesis results coming from a subset of views and the complete information (to fill occluded regions and extend field of view coverage) coming from many or all views (e.g., where each view may include one or more patches). This multi-pass scheme enables starting with a narrow subset of views for very coherent synthesis, then extending that subset to fill more information at a moderated coherent level, and finally using all views for a complete filling. Using such techniques, artifacts coming from the incoherence are minimized or eliminated. In some embodiments, the multi-pass solution is an add-on tool that may be applied to any view synthesis technique or multi-view video codecs. It is highly parallelizable and can be tuned to maintain real-time aspects as needed. These techniques become critical for preserving good image quality for natural content coming from many cameras with large baseline(s). These techniques can further improve synthesis results for refined or incoherent multi-view depth maps. They also improve synthesis results for synthetic computer generated content by reducing artifacts resulted from sharp transition is depth values when rendering with many virtual cameras. For example, embodiments may advantageously complete missing information whether by fill boundaries, reduce artifacts, and/or fill occlusions to improve the synthesis results.

Figure 3A:
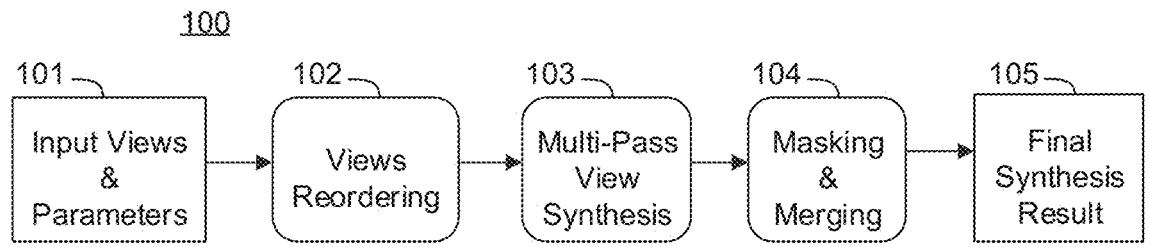
FIG. 3A is a flow diagram illustrating an example process for performing multi-pass view synthesis according to an embodiment.
Figure 3B:
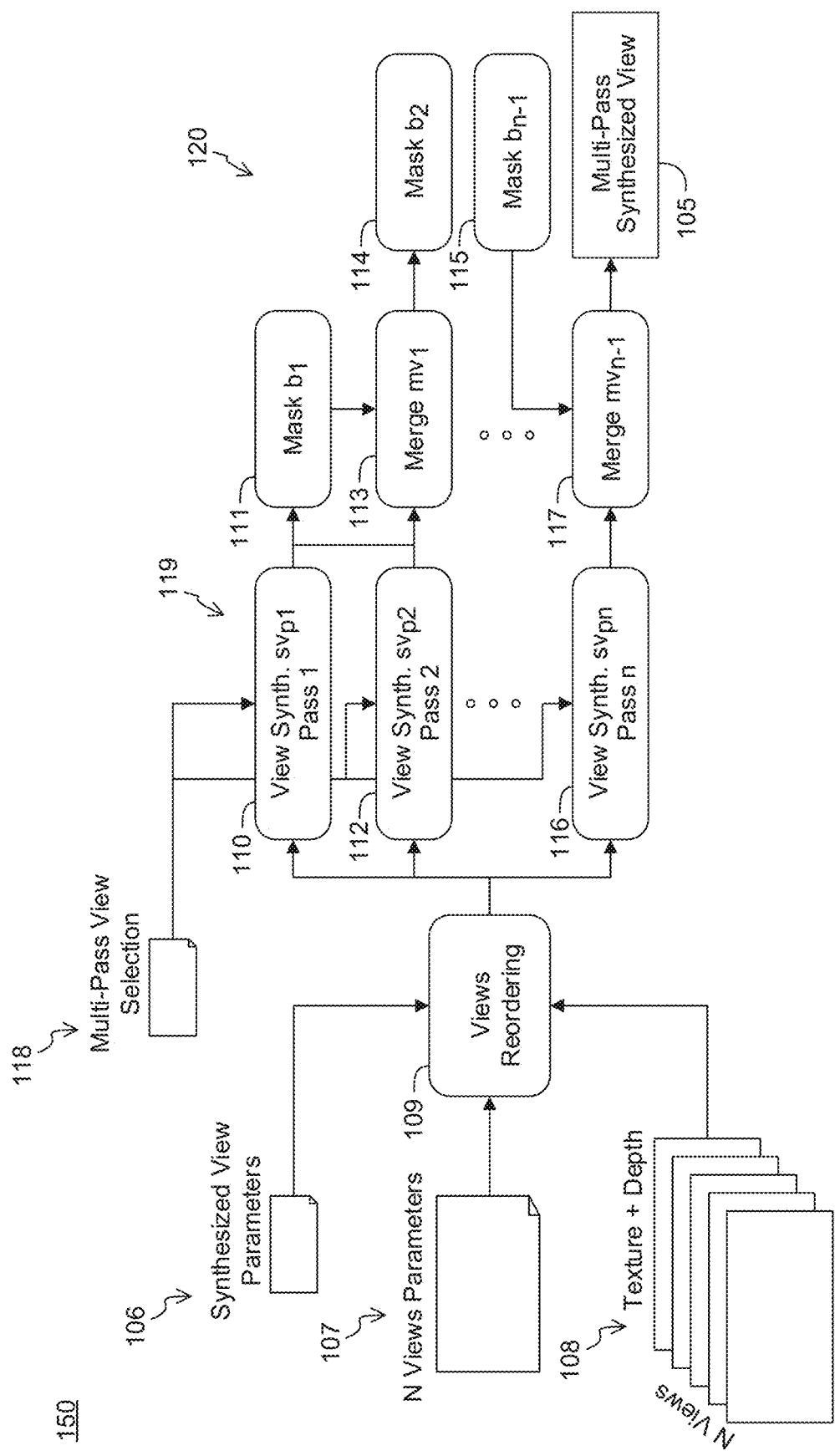
FIG. 3B is a block diagram of an example of a system for performing multi-pass view synthesis according to an embodiment.

FIG. 3A includes a flow diagram illustrating an example process 100 and FIG. 3B includes a block diagram illustrating an example system 150 for performing multi-pass view synthesis, arranged in accordance with at least some implementations of the present disclosure. Process 100 may be performed by and/or system 150 may be implemented by any suitable device or platform such as a personal computer, a laptop computer, a tablet, a phablet, a smart phone, a digital camera, a gaming console, a wearable device, a display device, an all-in-one device, a two-in-one device, or the like. In some embodiments, the multi-pass process discussed with respect to FIGS. 3A and 3B may be an add-on tool that may run on any view synthesis process or multi-view video codec process.

As shown, the following are provided as input 101: N views (i.e. texture videos of all available views along with their estimated depth maps, and where each view may include one or more patches), N views parameters (i.e. X- Y- Z-position & yaw- pitch- roll-orientation), synthesized view parameters, and a multi-pass view selection specifying the number of passes along with number of input views to be used in each pass. Input 101 may also include additional parameters related to the view synthesis technique (e.g., scale, resolution, blending factors, denoising factor, etc.).

Also as shown, the multi-pass techniques of process 100 include the following operations: views reordering 102, multi-pass view synthesis 103, and masking & merging stage 104. The multi-pass techniques of process 100 provide a final synthesis result 105 that is a coherent view synthesis with complete information. Each of operations 102, 103, 104 are described as follows.

As shown, a views reordering module 109 receives N views 108 such that views 108 include texture videos of all available views along with their estimated depth maps, N views parameters 107 such that N views parameters 107 include, for example, X- Y- Z-position & yaw- pitch-roll-orientation, and synthesized view parameters 106. Also as shown, a multi-pass view synthesis module 119 receives a multi-pass view selection 118.

The texture videos of views 108 may be attained, for example, via imaging devices such as video cameras. The texture videos may be RGB image data each having R (red), G (green), and B (blue), values for pixels thereof or image data in any suitable image space (e.g., YUV). In an embodiment, texture video pictures or frames have a resolution of 1920×1080 pixels. However, any resolution may be used. In some embodiments, video cameras may be arranged along side and/or above and below one another to form a camera array or grid. Such camera arrays or grids may include any number of cameras with such cameras spaced out in the x-direction (to provide a horizontal camera array), the y-direction (to provide a vertical camera array), or both (to provide a camera grid) to generate any number of video images.

The depth maps of views 108 may be attained or generated using any suitable technique or techniques such as block matching between adjacent video images, optical flow techniques, etc.

Views reordering module 109 determines the overlapped scene coverage between input views 108 and the desired synthesized view based on their relative positions and orientations. For example, if the cameras are all of same orientation (i.e. their optical axes are parallel to each other and pointing into the same direction), then the physical distance between their positions (i.e., the camera positions) will determine the overlap. In such examples, nearby cameras will be ordered first. On the other hand, if a camera is physically nearby the desired virtual camera (e.g., which would provide the synthesized view) but is orientated in the opposite direction resulting in less shared field of view, then the view captured by the camera is regarded as a far view. Based on the overlaps, the indexing of the input views is altered such that closer views are listed first and the farthest at the end. For example, input views having larger overlaps are listed first and those with smaller overlaps are listed last in a descending order.

As shown, the reordered views are provided to multi-pass view synthesis module 119. In some embodiments, a user or system setting may be made as to the number of passes that are to be performed. For example, the user or system may specify how many passes are desired and the number of input views per pass in an incremental order (i.e., number of input views increases as we go from pass 1 to pass n). In each pass 110, 112, 116, etc., a view synthesis is called to run on the selected input views and produce an intermediate view synthesis result. In some embodiments, running the passes is fully parallelized. That is, each pass may be performed without input from other passes and such passes are performed at least partially simultaneously. As used herein, the term fully parallelized with respect to processing indicates each paralyzed process is performed without input from the results of another process and such that the processers are performed at least partially simultaneously. It is noted that the view synthesis may be run without padding or inpainting options as sharp accurate edges are desirable to generate masks in the following operations.

As shown, the resultant intermediate view synthesis results are provided to a masking and merging module 120. Beginning with the most coherent synthesis (pass 1; $sv_{p1}$), a binary mask $b_1$ 111 is generated with values equal to 1 for holes in the intermediate view of pass 1 and 0 otherwise (or vice versa with respect to such binary masking). In some embodiments, the order of masking and merging of intermediate view synthesis results is from most coherent (e.g., most overlap between the virtual view and the views used to generate the intermediate view synthesis results) to less overlap. The overlap measure may be based on an average overlap or a least overlapping image. In some embodiments, the order of masking and merging of intermediate view synthesis results may also include using more views to generate the intermediate view synthesis results (e.g., in a monotonically function increase). That is, earlier masking and merge operations may be formed on intermediate view synthesis results from high overlap views to intermediate view synthesis results from less overlap views and/or from fewer high overlap views to more less overlap views. For example, some portions of a final intermediate view synthesis result may be well defined by high overlap views while missing pixels and/or edge pixels may be filled in using views with less overlap.

Notably, binary mask $b_1$ 111 may be noisy and/or filled with holes (since the intermediate syntheses were performed without inpainting). In some embodiments, to maintain continuity when merging a filtering morphological operations (i.e. erosion followed by dilation) are performed at a same kernel size to preserve edges. The kernel size may be tuned, for example, depending on the fidelity of the content and passed along with the multi-pass view selection parameters.

Once binary mask $b_1$ 111 is generated and cleaned, an inpainting or padding may be conducted on top of the intermediate view synthesis for homogeneous merging results. As shown, in some embodiments, binary mask $b_1$ 111 is used to merge the results of intermediate view synthesis of pass 1 ($sv_{p1}$) and the one from the following pass (pass 2; $sv_{p2}$) (after being inpainted) in accordance with Equation (1) to generate a merged intermediate view synthesis $mv_1$ 113:

$$mv_1 = sv_{p1} * (1-b_1) + sv_{p2} * b_1| \tag{1}$$

where $mv_1|$ is merged intermediate view synthesis 113, $sv_{p1}|$ is the intermediate view synthesis of pass 1, $sv_{p2}|$ is the intermediate view synthesis of pass 2, and $b_1|$ is binary mask $b_1$ 111 (using 1s for holes and 0s otherwise).

As shown, a new mask $b_2$ 114 is then generated using merged intermediate view synthesis $mv_1$ 113 (e.g., the first merged results), refined, and then used to merge again with the intermediate view synthesis results of pass 3 ($sv_{p3}$) in accordance with Equation (2):

$$mv_2 = mv_1 * (1-b_2) + sv_{p3} * b_2 \quad (2)$$

where $mv_2|$ is another merged intermediate view synthesis (not shown in FIG. 3B), $mv_1|$ merged intermediate view synthesis 113, $sv_{p3}|$ is the intermediate view synthesis of pass 3, and $b_2|$ is binary mask $b_2$ 114 (using 1s for holes and 0s otherwise).

Such operations continue until a merge with an intermediate view synthesis of a final pass ($sv_{pn}$) 117, which provides coherent and complete multi-pass view synthesis results (i.e. final synthesis result 105). It is noted that the same masking and merging operations may be applied on the associated depth maps if the target is to output depth map of the desired view as well.

Figure 4:
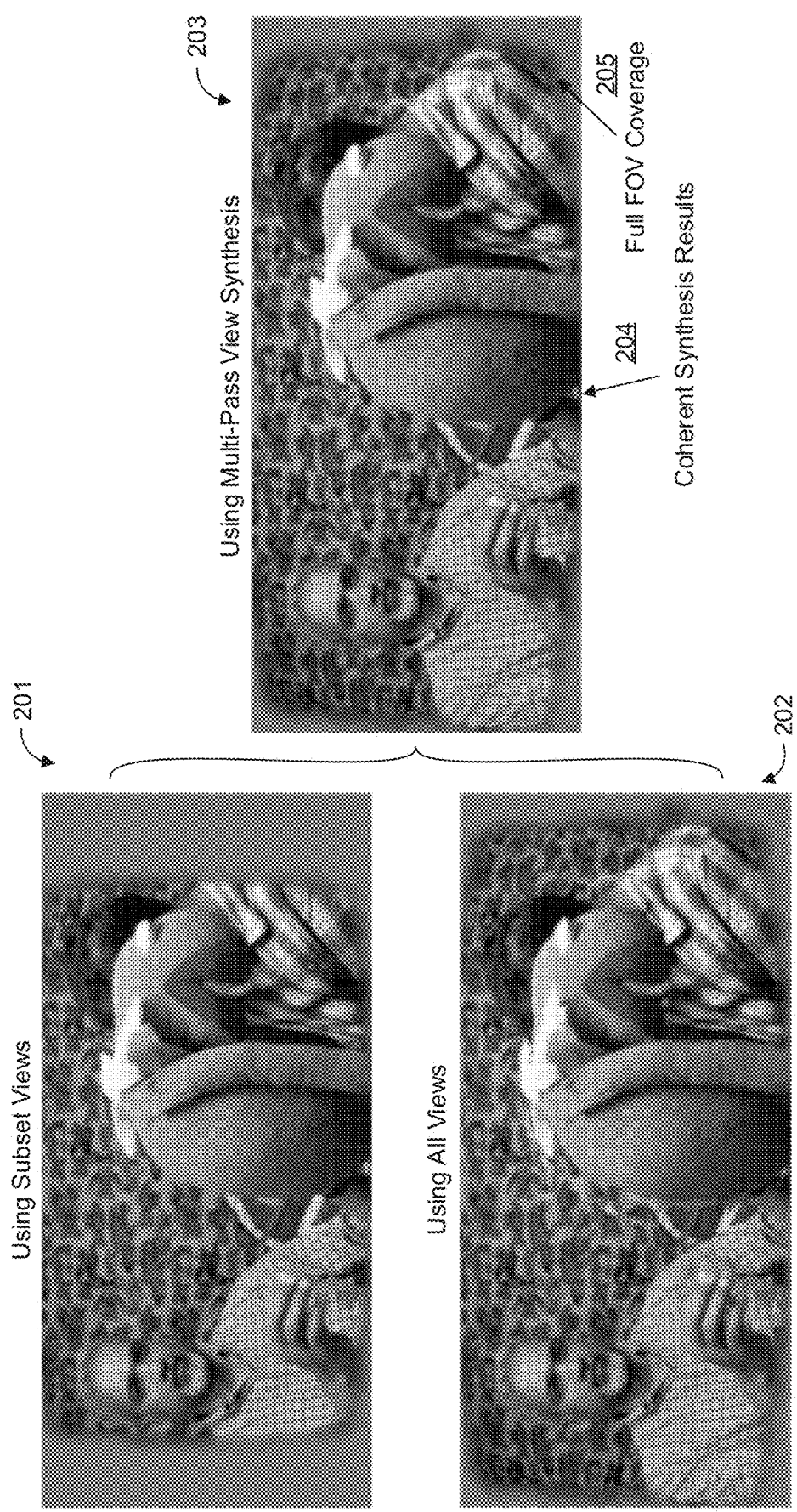
FIG. 4 illustrates example results of multi-pass view synthesis according to an embodiment.

FIG. 4 illustrates example results of multi-pass view synthesis, arranged in accordance with at least some implementations of the present disclosure. In the context of FIG. 4, a test sequence of content composed of 15 linear views ($v_0, v_1, \ldots, v_{14}$) having the same orientation (i.e., pointing to the scene) is represented. Assuming a two-pass synthesis mode where the goal is to synthesize the central view, $v_7$, in the first pass, only two neighboring views (i.e., $v_6$ and $v_8$) are used and in the second pass, all side views (i.e., $v_0, \ldots, v_6$ and $v_8, \ldots, v_{14}$) are used. In FIG. 4, image 201 illustrates the intermediate synthesis results for the first pass and image 202 illustrates the intermediate synthesis results for the second pass. Furthermore, image 203 illustrates the merged two-pass synthesis results. Notably, central part 204 is coherent (e.g., provide coherent synthesis results) and boundaries 205 have the complete information (e.g., full field of view coverage). For example, FIG. 4 illustrates an example of a two-pass technique that shows intermediate view synthesis results when using subset views (image 201) and all views (image 202), and final synthesis results after masking and merging (image 203). The image 201 (using subset views) exhibits coherent synthesis results, but has a limited field of view (FOV). The image 202 has a wide field of view, but exhibits some artifacts. Advantageously, the image 203 has both full FOV coverage and coherent synthesis results.

Figure 5:
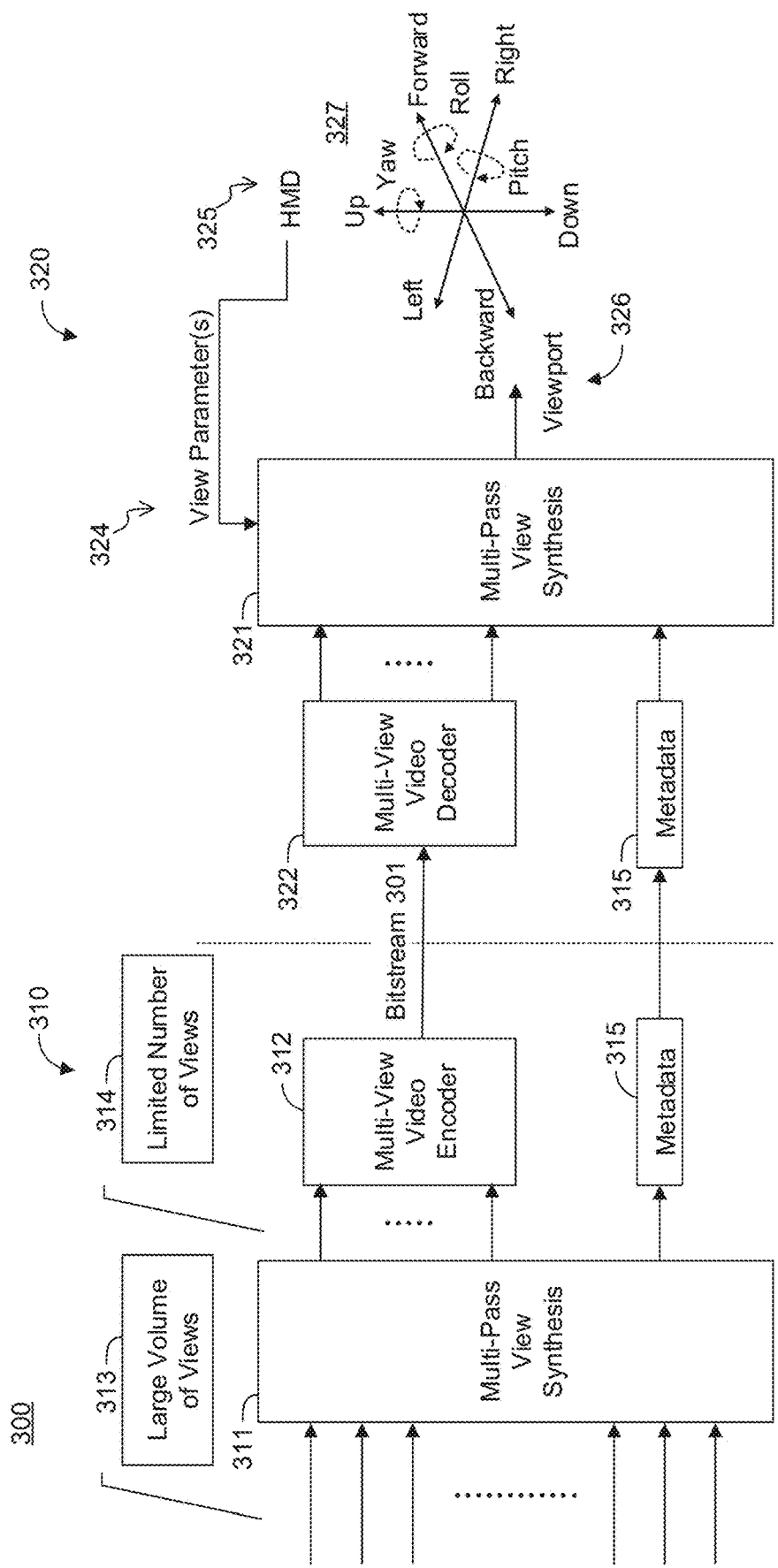
FIG. 5 illustrates an example encode and decode context for multi-view video according to an embodiment.

FIG. 5 illustrates an example encode and decode context 300 for multi-view video, arranged in accordance with at least some implementations of the present disclosure. As shown in FIG. 5, an encode system 310 may include a multi-pass view synthesis module 311 and a multi-view video encoder 312 and a decode system 320 may include a multi-pass view synthesis module 321 and a multi-view video decoder 322. Systems 310, 320 may be implemented in any suitable form factor device such as a personal computer, a laptop computer, a tablet, a phablet, a smart phone, a digital camera, a gaming console, a wearable device, a display device, an all-in-one device, a two-in-one device, or the like. For example, FIG. 5 provides for application of multi-pass view synthesis for multi-view video codecs. In some embodiments, multi-pass view synthesis module 311 and/or multi-pass view synthesis module 321 implements system 150.

Notably, multi-view video encodes attempt to exploit angular redundancy across all various views of the multi-view video in addition to the spatial and temporal redundancy per view. One technique for this includes synthesizing a smaller subset of views at key positions and orientations, and compressing and streaming the subset rather than processing all input views. Having a coherent and complete synthesized subset generated using the multi-pass techniques discussed herein provides significant bit saving and efficient compression/bandwidth utilization. As shown, multi-pass view synthesis module 311 receives a large volume of views 313 (i.e., N views) and generates a limited number of views 314 (i.e., M views such that M<N) using the techniques discussed herein with respect to FIGS. 3A and 3B. For example, views 314 may be virtual views as discussed herein. Limited number of views 314 are encoded via multi-view video encoder 312 to generate a bitstream 301 that is conveyed to decode system 320.

Similarly, at decode system 320 (e.g., the consuming device), multi-view decoder 322 decodes limited number of views 314 and multi-pass view synthesis module 321 generates a desired virtual view 326 for a viewport of a user. That is, decode system 320 synthesizes any desired view from decoded limited number of views 314 (e.g., the subset of views) only, rather than from all views. As shown, at decode system 320, a desired virtual view 326 is generated according to a view of a user (not shown) in environment 327. For example, the user may wear a head mounted display (HMD) 325, which may detect an orientation of the user with respect to 327 and provide the orientation as view parameters 324 such that view parameters 324 represent the desired virtual view for the user. Notably, context 300 represents a need for higher fidelity reconstructions of novel views as provided by the multi-pass techniques discussed herein.

In some embodiments, the multi-pass techniques are run independently at encode system 310 and decode system 320. In other embodiments, the multi-pass techniques at encode system 310 and decode system 320 are performed in accordance with each other. Such techniques are advantageous computationally and quality-wise. In an embodiment, at encode system 310 and decode system 320, the regions or patches of the merged multi-pass synthesized view can be attached with a flag specifying the pass number it is coming from during the merging process. This information can be sent within metadata 315 to the decode system 320 such that decode system 320 may accurately reverse the process to determine the original individual views contributing to these patches rather than simply doing that in a blind multi-pass at decode system 320. Such techniques save on the number of passes and reduce the computational complexity of decode system 320 (e.g., the multi-view decoder), which is a key feature for the support of multi-view video at large scale in consuming devices.

Furthermore, dynamic change of camera positions during video capture may require dynamic change to the position of the synthesized virtual views selected for the streaming to completely cover the scene at the encoder side. That is, the number and positions of limited number of views 314 may change due to changing camera positions. Such changes require frequently updating the positions of these virtual views through via metadata 315 such that the multi-pass synthesis can adjust to the updated input subset views parameters and still deliver coherent reconstructions.

In context 300, bitrates, quality, and lower complexity at decode system 320 are critical aspects in multi-view video codec implementations. The discussed multi-pass techniques deliver on these aspects for a variety of content, including synthetic content and real-world or natural content (i.e., content attained via image and video capture of a scene).

As described above, it may be advantageous to improve virtual views, which attempt to approximate a view for a location between locations of available images. For example, to provide an immersive experience for viewing content created planar camera arrays or other multi-view systems, high quality and efficiently generated virtual views for positions between camera positions are needed. Techniques discussed herein render realistic virtual images at positions between captured camera views efficiently, fully automatically, and with no or minimal visual artifacts. Multi-view devices and notably, camera arrays, are becoming increasingly common in numerous immersive visual applications including virtual navigation of a scene such as outside-in rendering from multiple views of an object (e.g., volume rendering), generation of stereoscopic panoramas from circular configurations of camera arrays (e.g., inside-out rendering for VR), interactive multi-view video applications (e.g., teleconferencing), etc. The techniques discussed herein may be used in any context where a virtual image is to be generated. The input images may be attained in any suitable manner such as image capture via cameras, image or graphics rendering, or such input images may be received from memory or another device for processing.

Figure 6:
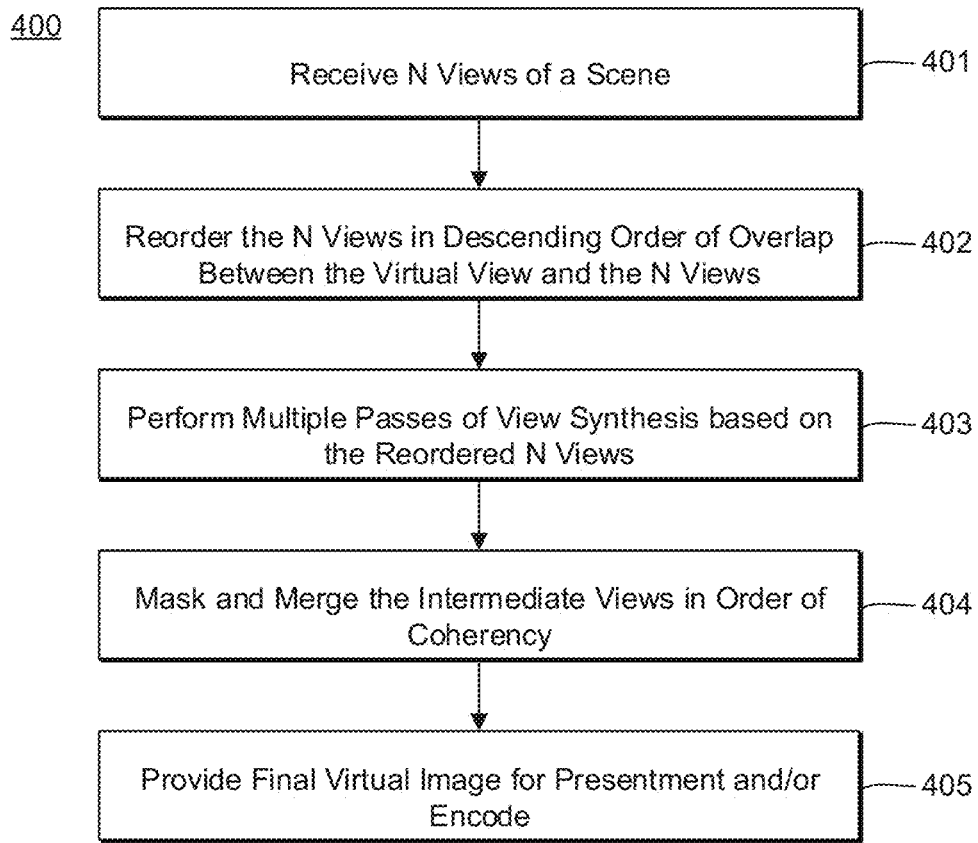
FIG. 6 is a flow diagram illustrating an example process for performing view synthesis of a virtual view of a scene according to an embodiment.

FIG. 6 is a flow diagram illustrating an example process 400 for performing view synthesis of a virtual view of a scene, arranged in accordance with at least some implementations of the present disclosure. Process 400 may include one or more operations 401-405 as illustrated in FIG. 6. Process 400 may form at least part of a virtual view generation process. By way of non-limiting example, process 400 may form at least part of a virtual view generation process as performed by system 150 as discussed herein. In some embodiments, process 400 is performed by encode system 310. In some embodiments, process 400 is performed by decode system 320. Furthermore, process 400 will be described herein with reference to system 450 of FIG. 7.

Figure 7:
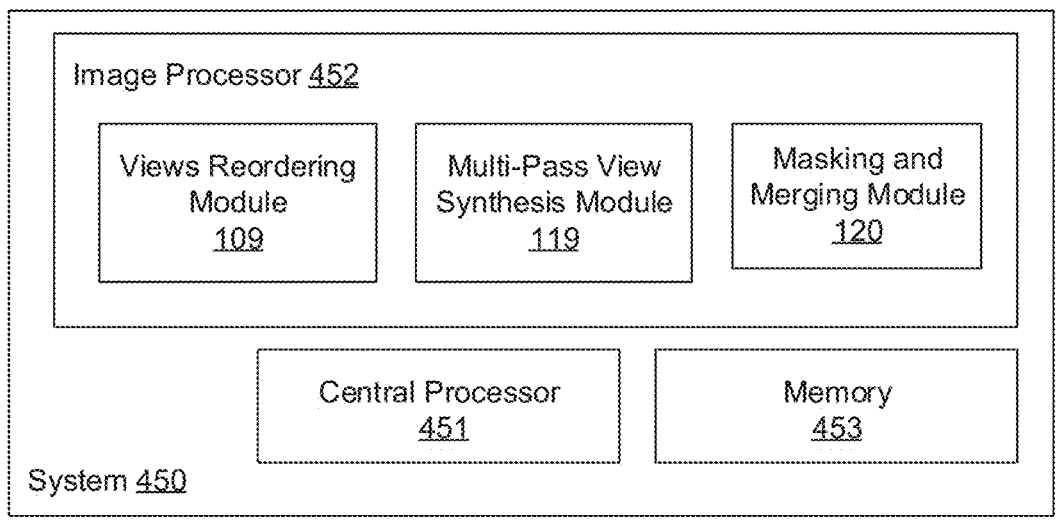
FIG. 7 is an illustrative diagram of an example system for performing view synthesis of a virtual view of a scene according to an embodiment.

FIG. 7 is an illustrative diagram of an example system 450 for performing view synthesis of a virtual view of a scene, arranged in accordance with at least some implementations of the present disclosure. As shown in FIG. 7, system 450 may include a central processor 451, an image processor 452, and a memory 453 Also as shown, image processor 452 may include or implement views reordering module 109, multi-pass view synthesis module 119, and masking and merging module 120. In the example of system 450, memory 453 may store image or frame data, synthesized view data, filled mask data, bitstream data, or any other data discussed herein.

As shown, in some examples, one or more or portions of views reordering module 109, multi-pass view synthesis module 119, and masking and merging module 120 are implemented via image processor 452. In other examples, one or more or portions of views reordering module 109, multi-pass view synthesis module 119, and masking and merging module 120 are implemented via central processor 451, an image processing unit, an image processing pipeline, an image signal processor, or the like. In some examples, one or more or portions of views reordering module 109, multi-pass view synthesis module 119, and masking and merging module 120 are implemented in hardware as a system-on-a-chip (SoC). In some examples, one or more or portions of views reordering module 109, multi-pass view synthesis module 119, and masking and merging module 120 are implemented in hardware via a FPGA.

Image processor 452 may include any number and type of image or graphics processing units that may provide the operations as discussed herein. Such operations may be implemented via software or hardware or a combination thereof. For example, image processor 452 may include circuitry dedicated to manipulate and/or analyze images obtained from memory 453. Central processor 451 may include any number and type of processing units or modules that may provide control and other high level functions for system 450 and/or provide any operations as discussed herein. Memory 453 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 453 may be implemented by cache memory. In an embodiment, one or more or portions of views reordering module 109, multi-pass view synthesis module 119, and masking and merging module 120 are implemented via an execution unit (EU) of image processor 452. The EU may include, for example, programmable logic or circuitry such as a logic core or cores that may provide a wide array of programmable logic functions. In an embodiment, one or more or portions of views reordering module 109, multi-pass view synthesis module 119, and masking and merging module 120 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 6, process 400 begins at operation 401, where N views of a scene are received (e.g., where each view may include one or more patches). The N views may include any number of images in any suitable format. The views may be pictures or frames of multi-view video or individual pictures of a scene. In some embodiments, the N views include texture pictures of video and corresponding estimated depth maps. In some embodiments, at operation 401, corresponding N views parameters (i.e. X- Y- Z-position & yaw- pitch- roll-orientation), synthesized view parameters, and a multi-pass view selection specifying the number of passes along with number of input views to be used in each pass are also received. In some embodiments, the N views are received from corresponding N cameras. In some embodiments, the N views are received from a multi-view video decoder.

Processing continues at operation 402, where the N views are reordered as needed into descending order of overlap between the desired virtual view and each of the N views. The overlap between the desired virtual view and each of the N views may be determined using any suitable technique or techniques. For example, the overlapped scene coverage between each of the N views and the desired synthesized view may be determined based on their relative positions and orientations. In some embodiments, the overlap includes the portion of each view that is shared between the views. For example, if the cameras are all of same orientation, then the physical distance between their positions (i.e., the camera positions) will determine the overlap such that cameras near a virtual camera (e.g., a position of a camera as if from the virtual view to be synthesized) will be ordered first. In some embodiments, if a camera is physically nearby the desired virtual camera but is orientated in the opposite direction resulting in less shared field of view, then the view captured by the camera is regarded as a far view (e.g., with very little overlap). Based on the overlaps, the indexing of the input views is altered such that closer views with respect to the virtual view are listed first and the farthest views with respect to the virtual view are listed at the end.

Processing continues at operation 403, where multiple passes of view synthesis are performed based on the reordered N views. Any number of passes may be performed. In some embodiments, the number is received from a user or a system interface or the like. For example, more passes may provide higher quality at the cost of increased computational complexity and/or time. Furthermore, each of the passes may use any number of the N views to generate each virtual view. Such numbers of passes, numbers and selection of the reordered N views may be made using any suitable technique or techniques. As will be appreciated for each of the passes performed at operation 403, a corresponding intermediate view synthesis result is generated.

Processing continues at operation 404, where the intermediate view synthesis results generated are masked and merged beginning with the most coherent intermediate view synthesis result. The most coherent intermediate view synthesis result may be selected using any suitable technique or techniques. In an embodiment, the most coherent intermediate view synthesis result corresponds to a view synthesis using the highest overlap as discussed with respect to operation 402. In some embodiments, a binary mask is generated based on the most coherent intermediate view synthesis result such that the mask has a value of 1 for pixel location where the most coherent intermediate view synthesis result has a hole and a value of 0 for pixel locations where the most coherent intermediate view synthesis result has a valid pixel value. Thereby, a hole mask is generated for the most coherent intermediate view synthesis result.

The binary mask is then used to merge the most coherent intermediate view synthesis result with another intermediate view synthesis result (e.g., the second most coherent intermediate view synthesis result) such that, when the mask has a value of 1, a pixel value of the second intermediate view synthesis result is used and, when the mask has a value of 0, a pixel value of the most coherent intermediate view synthesis result is used in accordance with Equation (1). The merged intermediate view synthesis result is then masked in the same manner and the resultant mask is used to merge the merged intermediate view synthesis result with yet another intermediate view synthesis result (e.g., the third most coherent intermediate view synthesis result), and so on through the last intermediate view synthesis result. For example, if P passes are used at operation 403 to generate P intermediate view synthesis result, P−1 merge operations may be used to merge the intermediate view synthesis result that include merging 1st to the 2nd, the 2nd to the 3rd, and so on through merging the P−1 to the P. As discussed, the resultant intermediate view synthesis result (e.g., intermediate in that it is between camera positions) has high quality and coherency.

Processing continues at operation 405, where the final virtual image may be provided for presentation to a viewer and/or encode. The final virtual image may be provided for presentation using any suitable technique or techniques. In an embodiment, providing the final virtual image for presentation to the viewer includes transmitting the final virtual image to a receiving device having a display screen. In an embodiment, providing the final virtual image for presentation to the viewer includes transmitting final virtual image to a memory. As used herein, providing an image for presentation includes transmitting the image to a display device, storing the image to memory for later display, and/or transmitting the image to another device for display at that device. Furthermore, the final virtual image may be provided for encode as discussed with respect to FIG. 5. For example, multiple final virtual images, each representing one of limited number of views 314 of a scene may be encoded using multi-view video encoder 312 to generate bitstream 301.

Atlas Examples

In some embodiments, the view representations may be arranged in one or more atlases. An atlas may refer to an aggregation of patches from one or more view representations after a packing process, into a picture pair which contains a texture component picture and a corresponding depth component picture. A patch may refer to a rectangular region within an atlas that corresponds to a rectangular region within a view representation. The rectangular region represented by a patch may be as large as the atlas or as the view representation. A patch descriptor may refer to a description of the patch, containing its size, location within an atlas, rotation within an atlas, and location within a view representation. An atlas parameters list may define how patches are packed within the atlas(es) and mapped to specific view representations in addition to the patches' size and rotation within the atlas(es). An atlas patch occupancy map may refer to a two dimensional array corresponding to an atlas whose values indicate for each sample position in the atlas which patch the sample corresponds to, or if the sample is invalid. Camera parameters may define the projection used to generate a view representation from a 3D scene, including intrinsic and extrinsic parameters. For example, an atlas may provide a useful way to organize image data for immersive video. In some embodiments, an immersive video encoder may include a view optimizer module, an atlas constructor module, and a video encoder and metadata composer module. Similarly, the immersive video decoder may include a video decoder and metadata parser module, an atlas patch occupancy map generator module (e.g., sometimes referred to as an atlas deconstructor), and a renderer module.

Figure 8:
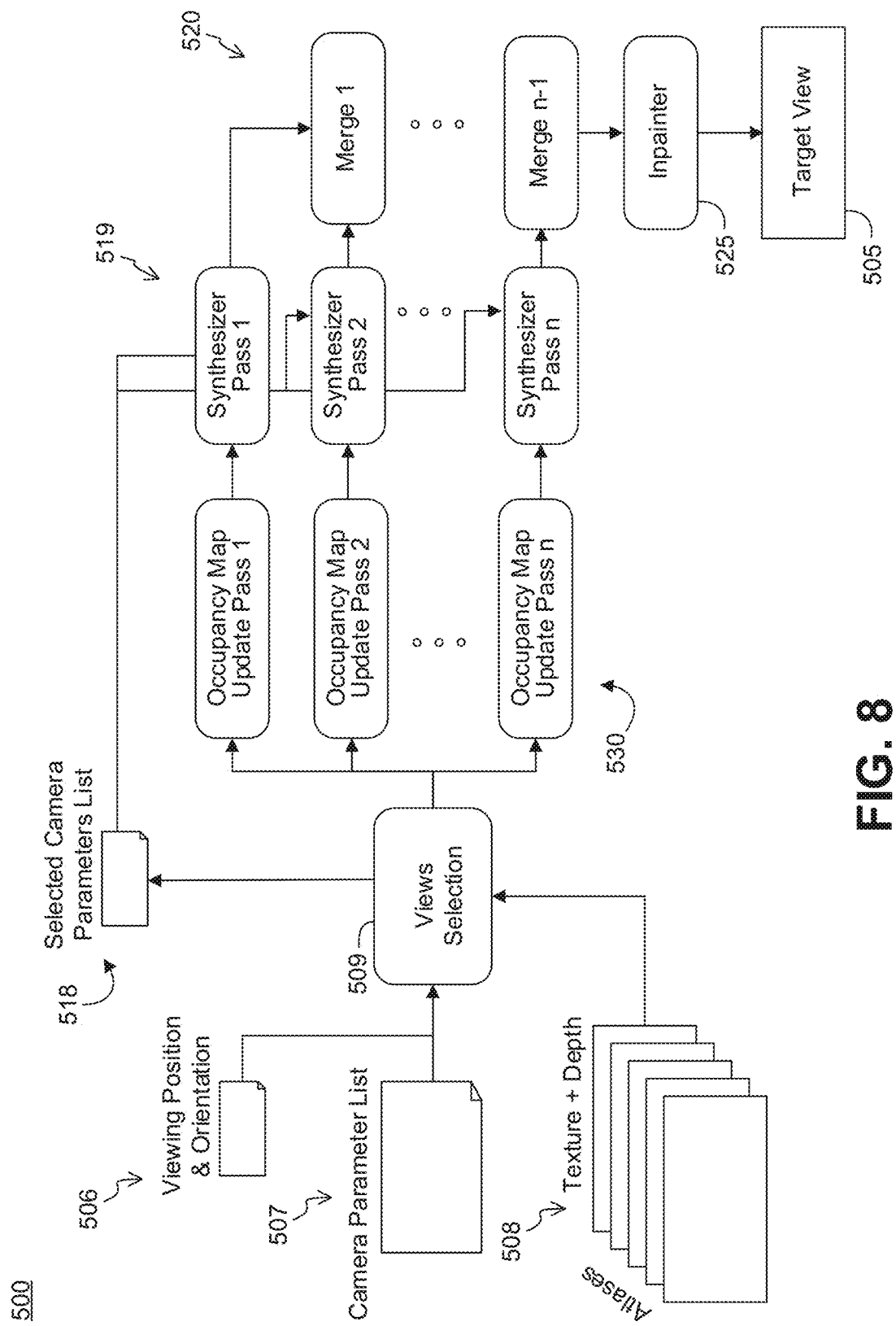
FIG. 8 is a block diagram of another example of a system for performing multi-pass view synthesis according to an embodiment.

With reference to FIG. 8, an embodiment of a system 500 may include multi-pass controller that takes one or more atlases 508 as inputs to represent a plurality of views. For example, a video decoder may receive HEVC encoded atlases. The texture component and the depth component may be decoded independently by HEVC decoders. A metadata parser may split the received metadata into a camera parameters list 507 and an atlas parameters list. The atlas parameters list may be used by an atlas patch occupancy map generator module 530. The camera parameters list 507 and viewing position and orientation information 506 may be used by the views selection module 509 to produce the viewport requested (e.g., corresponding to a selected cameras parameter list 518).

The atlas patch occupancy map generator module 530 may generate an occupancy map for each atlas. The occupancy map has the same size as the atlas and for each sample identifies the number of the patch that sample belongs to. The map may be created by browsing the atlas parameters list from the parsed metadata exactly in the same order as during creation of the atlas, to resolve any overlapping. The occupancy map is then used in a loop on the atlas's samples to identify the samples' respective patch identifiers, which itself enables determining the respective camera identifiers, hence enabling the de-projection and re-projection on the viewport.

The system 500 may include a controller to accept the input data and to invoke the synthesizer module 519 and the inpainter 525 in a multi-pass manner, and to forward the output target view 505. The synthesizer module 519 reprojects, rasterizes and blends the input data (e.g., utilizing the technology described herein). The Inpainter 525 replaces any missing pixels (e.g., indicated by level 0 in the depth map) with interpolated texture and depth data. For example, the controller invokes the synthesizer module 519 in multiple passes where the number of passes and the number of views per pass may be tuned as part of the configuration parameters. At first only nearby views (or patches belonging to nearby views) are used for the synthesis to output coherent synthesis results. Then, the view selection is extended to include views further away (or patches belonging to views further away) from the target view to output more complete synthesis results. The process is repeated over the chosen number of passes. When operating on atlases, local occupancy maps are created per pass such that they include only the patch identifiers of patches from the selected views per pass. Then the local occupancy maps are passed to the synthesizer module 519 to render only these selected patches. Afterward, the synthesis results of individual passes are merged together by a mask and merge module 520 in a successive manner to output a coherent and complete synthesis result. Finally, the inpainter 525 is engaged to fill the missing regions prior to outputting the requested target view 505.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 9:
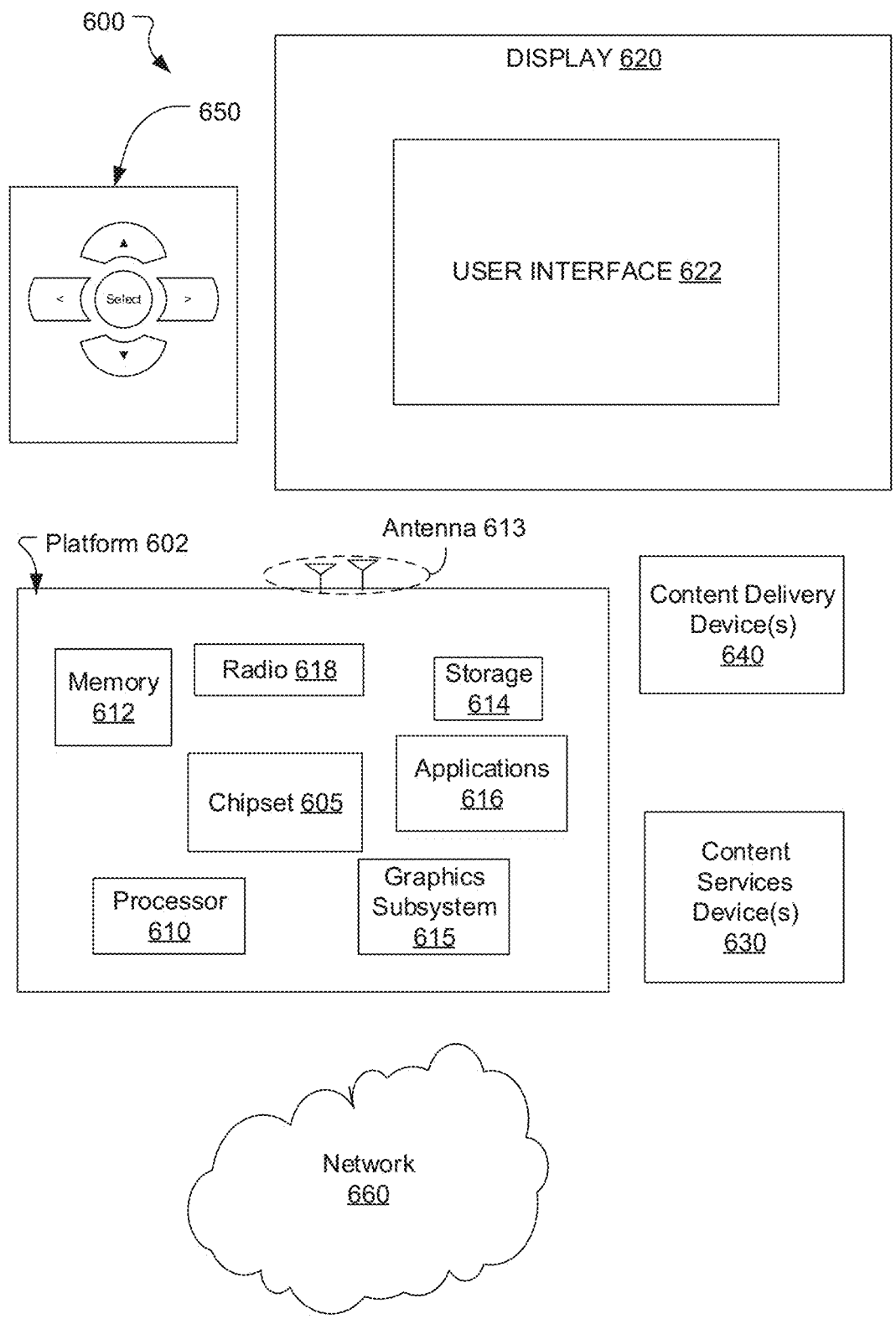
FIG. 9 is an illustrative diagram of another example system.

FIG. 9 is an illustrative diagram of an example system 600, arranged in accordance with at least some implementations of the present disclosure. In various implementations, system 600 may be a mobile device system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 600 includes a platform 602 coupled to a display 620. Platform 602 may receive content from a content device such as content services device(s) 630 or content delivery device(s) 640 or other content sources such as image sensors 619. For example, platform 602 may receive image data as discussed herein from image sensors 619 or any other content source. A navigation controller 650 including one or more navigation features may be used to interact with, for example, platform 602 and/or display 620. Each of these components is described in greater detail below.

In various implementations, platform 602 may include any combination of a chipset 605, processor 610, memory 612, antenna 613, storage 614, graphics subsystem 615, applications 616, image signal processor 617 and/or radio 618. Chipset 605 may provide intercommunication among processor 610, memory 612, storage 614, graphics subsystem 615, applications 616, image signal processor 617 and/or radio 618. For example, chipset 605 may include a storage adapter (not depicted) capable of providing intercommunication with storage 614.

Processor 610 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 610 may be dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 614 may include technology to increase the storage performance enhanced protection for valuable digital media when multiple hard drives are included, for example.

Image signal processor 617 may be implemented as a specialized digital signal processor or the like used for image processing. In some examples, image signal processor 617 may be implemented based on a single instruction multiple data or multiple instruction multiple data architecture or the like. In some examples, image signal processor 617 may be characterized as a media processor. As discussed herein, image signal processor 617 may be implemented based on a system on a chip architecture and/or based on a multi-core architecture.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 may be integrated into processor 610 or chipset 605. In some implementations, graphics subsystem 615 may be a stand-alone device communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In various implementations, display 620 may include any television type monitor or display. Display 620 may include, for example, a computer display screen, touch screen display, video monitor, television-like device, and/or a television. Display 620 may be digital and/or analog. In various implementations, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In various implementations, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

Image sensors 619 may include any suitable image sensors that may provide image data based on a scene. For example, image sensors 619 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 619 may include any device that may detect information of a scene to generate image data.

In various implementations, content services device(s) 630 may include a cable television box, personal computer, network, telephone, Internet enabled devices or appliance capable of delivering digital information and/or content, and any other similar device capable of uni-directionally or bi-directionally communicating content between content providers and platform 602 and/display 620, via network 660 or directly. It will be appreciated that the content may be communicated uni-directionally and/or bi-directionally to and from any one of the components in system 600 and a content provider via network 660. Examples of content may include any media information including, for example, video, music, medical and gaming information, and so forth.

Content services device(s) 630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 602 may receive control signals from navigation controller 650 having one or more navigation features. The navigation features of navigation controller 650 may be used to interact with user interface 622, for example. In various embodiments, navigation controller 650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 650 may be replicated on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In various embodiments, navigation controller 650 may not be a separate component but may be integrated into platform 602 and/or display 620. The present disclosure, however, is not limited to the elements or in the context shown or described herein.

In various implementations, drivers (not shown) may include technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 even when the platform is turned "off." In addition, chipset 605 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
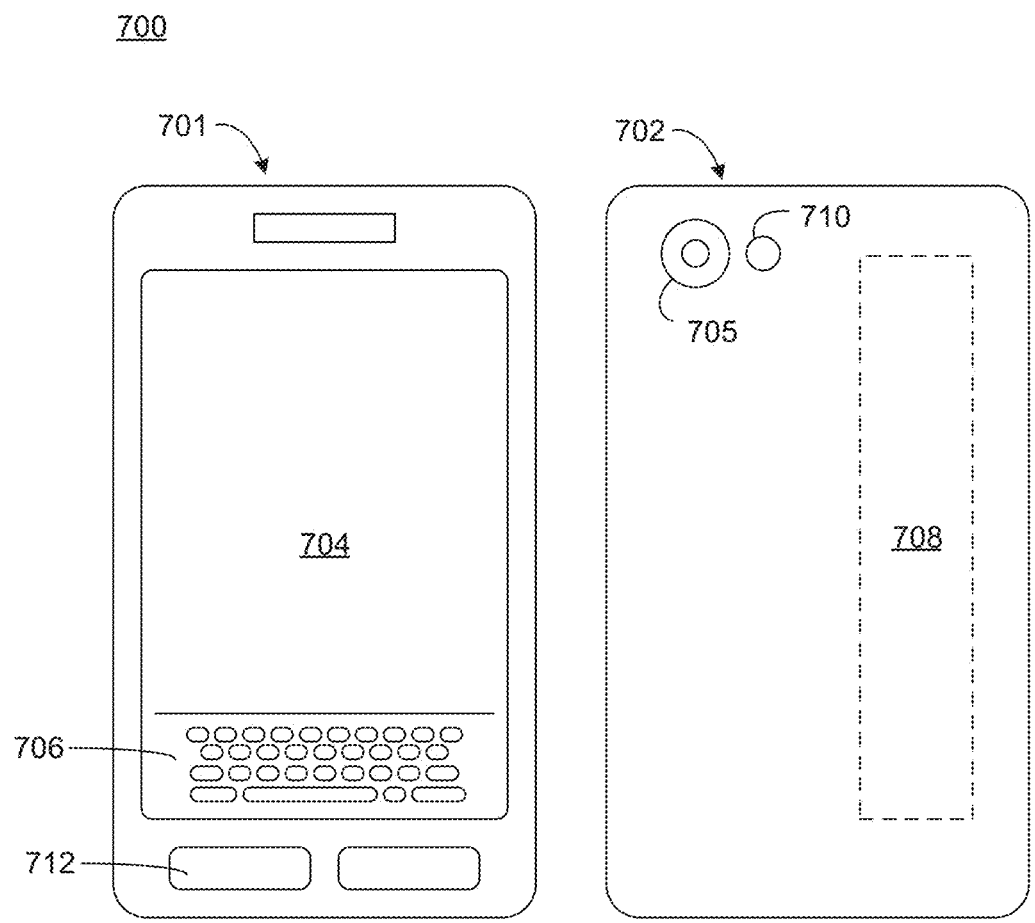
FIG. 10 illustrates an example device, all arranged in accordance with at least some implementations of the present disclosure.

As described above, system 600 may be embodied in varying physical styles or form factors. FIG. 10 illustrates an example small form factor device 700, arranged in accordance with at least some implementations of the present disclosure. In some examples, system 600 may be implemented via device 700. In other examples, other systems, components, or modules discussed herein or portions thereof may be implemented via device 700. In various embodiments, for example, device 700 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 10, device 700 may include a housing with a front 701 and a back 702. Device 700 includes a display 704, an input/output (I/O) device 706, a color camera 721, a color camera 722, and an integrated antenna 708. In some embodiments, color camera 721 and color camera 722 attain planar images as discussed herein. In some embodiments, device 700 does not include color camera 721 and 722 and device 700 attains input image data (e.g., any input image data discussed herein) from another device. Device 700 also may include navigation features 712. I/O device 706 may include any suitable I/O device for entering information into a mobile computing device. Examples for I/O device 706 may include an alphanumeric keyboard, a numeric keypad, a touch pad, input keys, buttons, switches, microphones, speakers, voice recognition device and software, and so forth. Information also may be entered into device 700 by way of microphone (not shown), or may be digitized by a voice recognition device. As shown, device 700 may include color cameras 721, 722, and a flash 710 integrated into back 702 (or elsewhere) of device 700. In other examples, color cameras 721, 722, and flash 710 may be integrated into front 701 of device 700 or both front and back sets of cameras may be provided. Color cameras 721, 722 and a flash 710 may be components of a camera module to originate color image data with IR texture correction that may be processed into an image or streaming video that is output to display 704 and/or communicated remotely from device 700 via antenna 708 for example.

The system 600 and/or the device 700 may include one or more features or aspects of the various embodiments described herein, including those described in the following examples.

ADDITIONAL NOTES AND EXAMPLES

Example 1 includes an electronic system, comprising memory to store a plurality of views, a processor communicatively coupled to the memory, and logic coupled to the processor, the logic to re-order the plurality of views based on one or more of relative position and orientation related information for the plurality of views, perform two or more view synthesis passes for two or more of the plurality of views to provide two or more intermediate view synthesis results, and mask and merge the two or more intermediate view synthesis results to provide a final view synthesis result.

Example 2 includes the system of example 1, wherein the logic is further to re-order the plurality of views based on a distance between each view and a desired synthesized view.

Example 3 includes the system of example 2, wherein the logic is further to determine overlapped scene coverage information between the plurality of scenes and the desired synthesized view based on the one or more of relative position and orientation related information, and re-order the plurality of views in an order from a relatively largest overlap to a relatively smallest overlap based on the determined overlapped scene coverage information.

Example 4 includes the system of any of examples 1 to 3, wherein the logic is further to perform two or more of the view synthesis passes in parallel with each other.

Example 5 includes the system of example 4, wherein the logic is further to determine one or more of a number of passes and a number of views for the performed view synthesis based on one or more user-provided parameters.

Example 6 includes the system of any of examples 1 to 5, wherein the logic is further to generate a binary mask to identify holes in an intermediate view.

Example 7 includes the system of example 6, wherein the logic is further to merge two intermediate view synthesis results based on an overlap between the two intermediate view synthesis results and the binary mask.

Example 8 includes a method of processing an image, comprising re-ordering a plurality of views based on one or more of relative position and orientation related information for the plurality of views, performing two or more view synthesis passes for two or more of the plurality of views to provide two or more intermediate view synthesis results, and masking and merging the two or more intermediate view synthesis results to provide a final view synthesis result.

Example 9 includes the method of example 8, further comprising re-ordering the plurality of views based on a distance between each view and a desired synthesized view.

Example 10 includes the method of example 9, further comprising determining overlapped scene coverage information for the plurality of scenes based on the one or more of relative position and orientation related information, and re-ordering the plurality of views in an order from a relatively largest overlap to a relatively smallest overlap based on the determined overlapped scene coverage information.

Example 11 includes the method of any of examples 8 to 10, further comprising performing two or more of the view synthesis passes in parallel with each other.

Example 12 includes the method of example 11, further comprising determining one or more of a number of passes and a number of views for the performed view synthesis based on one or more user-provided parameters.

Example 13 includes the method of any of examples 8 to 12, further comprising generating a binary mask to identify holes in an intermediate view.

Example 14 includes the method of example 13, further comprising merging two intermediate view synthesis results based on an overlap between the two intermediate view synthesis results and the binary mask.

Example 15 includes at least one machine readable medium comprising a plurality of instructions that, in response to being executed on a computing device, cause the computing device to re-order a plurality of views based on one or more of relative position and orientation related information for the plurality of views, perform two or more view synthesis passes for two or more of the plurality of views to provide two or more intermediate view synthesis results, and mask and merge the two or more intermediate view synthesis results to provide a final view synthesis result.

Example 16 includes the machine readable medium of example 15, comprising a plurality of further instructions that, in response to being executed on the computing device, cause the computing device to re-order the plurality of views based on a distance between each view and a desired synthesized view.

Example 17 includes the machine readable medium of example 16, comprising a plurality of further instructions that, in response to being executed on the computing device, cause the computing device to determine overlapped scene coverage information for the plurality of scenes based on the one or more of relative position and orientation related information, and re-order the plurality of views in an order from a relatively largest overlap to a relatively smallest overlap based on the determined overlapped scene coverage information.

Example 18 includes the machine readable medium of any of examples 15 to 17, comprising a plurality of further instructions that, in response to being executed on the computing device, cause the computing device to perform two or more of the view synthesis passes in parallel with each other.

Example 19 includes the machine readable medium of example 18, comprising a plurality of further instructions that, in response to being executed on the computing device, cause the computing device to determine one or more of a number of passes and a number of views for the performed view synthesis based on one or more user-provided parameters.

Example 20 includes the machine readable medium of any of examples 15 to 19, comprising a plurality of further instructions that, in response to being executed on the computing device, cause the computing device to generate a binary mask to identify holes in an intermediate view.

Example 21 includes the machine readable medium of example 20, comprising a plurality of further instructions that, in response to being executed on the computing device, cause the computing device to merge two intermediate view synthesis results based on an overlap between the two intermediate view synthesis results and the binary mask.

Example 22 includes an image processing apparatus, comprising one or more substrates, and logic coupled to the one or more substrates, the logic to re-ordering a plurality of views based on one or more of relative position and orientation related information for the plurality of views, performing two or more view synthesis passes for two or more of the plurality of views to provide two or more intermediate view synthesis results, and masking and merging the two or more intermediate view synthesis results to provide a final view synthesis result.

Example 23 includes the apparatus of example 22, wherein the logic is further to re-order the plurality of views based on a distance between each view and a desired synthesized view.

Example 24 includes the apparatus of example 23, wherein the logic is further to determine overlapped scene coverage information for the plurality of scenes based on the one or more of relative position and orientation related information, and re-order the plurality of views in an order from a relatively largest overlap to a relatively smallest overlap based on the determined overlapped scene coverage information.

Example 25 includes the apparatus of any of examples 22 to 24, wherein the logic is further to perform two or more of the view synthesis passes in parallel with each other.

Example 26 includes the apparatus of example 25, wherein the logic is further to determine one or more of a number of passes and a number of views for the performed view synthesis based on one or more user-provided parameters.

Example 27 includes the apparatus of any of examples 22 to 26, wherein the logic is further to generate a binary mask to identify holes in an intermediate view.

Example 28 includes the apparatus of example 27, wherein the logic is further to merge two intermediate view synthesis results based on an overlap between the two intermediate view synthesis results and the binary mask.

Example 29 includes an image processing apparatus, comprising means for re-ordering a plurality of views based on one or more of relative position and orientation related information for the plurality of views, means for performing two or more view synthesis passes for two or more of the plurality of views to provide two or more intermediate view synthesis results, and means for masking and merging the two or more intermediate view synthesis results to provide a final view synthesis result.

Example 30 includes the apparatus of example 29, further comprising means for re-ordering the plurality of views based on a distance between each view and a desired synthesized view.

Example 31 includes the apparatus of example 30, further comprising means for determining overlapped scene coverage information for the plurality of scenes based on the one or more of relative position and orientation related information, and means for re-ordering the plurality of views in an order from a relatively largest overlap to a relatively smallest overlap based on the determined overlapped scene coverage information.

Example 32 includes the apparatus of any of examples 29 to 31, further comprising means for performing two or more of the view synthesis passes in parallel with each other.

Example 33 includes the apparatus of example 32, further comprising means for determining one or more of a number of passes and a number of views for the performed view synthesis based on one or more user-provided parameters.

Example 34 includes the apparatus of any of examples 29 to 33, further comprising means for generating a binary mask to identify holes in an intermediate view.

Example 35 includes the apparatus of example 34, further comprising means for merging two intermediate view synthesis results based on an overlap between the two intermediate view synthesis results and the binary mask.

Example 36 includes an electronic system, comprising memory to store one or more patches from a plurality of views, a processor communicatively coupled to the memory, and logic coupled to the processor, the logic to re-order the one or more patches from the plurality of views based on one or more of relative position and orientation related information for a desired synthesized view, select a respective set of views to be used for each of two or more view synthesis passes, perform the two or more view synthesis passes for the desired synthesized view using only patches belonging to the selected set of views for each pass to provide two or more intermediate view synthesis results, and mask and merge the two or more intermediate view synthesis results to provide a final view synthesis result.

Example 37 includes the system of Example 36, wherein the logic is further to re-order the one or more patches from the plurality of views based on a distance between each view and the desired synthesized view.

Example 38 includes the system of Example 37, wherein the logic is further to determine overlapped scene coverage information between the plurality of views and the desired synthesized view based on the one or more of relative position and orientation related information, and re-order the one or more patches from the plurality of views in an order from a relatively largest overlap to a relatively smallest overlap based on the determined overlapped scene coverage information between the plurality of views and the desired synthesized view.

Example 39 includes the system of any of Examples 36 to 38, wherein the logic is further to perform two or more of the view synthesis passes in parallel with each other.

Example 40 includes the system of Example 39, wherein the logic is further to determine one or more of a number of passes and a number of views for the performed view synthesis based on one or more user-provided parameters.

Example 41 includes the system of any of Examples 36 to 40, wherein the logic is further to generate a binary mask to identify missing information in an intermediate view.

Example 42 includes the system of Example 41, wherein the logic is further to merge two intermediate view synthesis results based on the binary mask such that missing information is taken from the higher pass intermediate synthesized view and coherent synthesis information is taken from the lower pass intermediate synthesized view, and repeat the merge consecutively for each intermediate synthesized view result.

Example 43 includes a method of processing an image, comprising re-ordering one or more patches from a plurality of views based on one or more of relative position and orientation related information for a desired synthesized view, selecting a respective set of views to be used for each of two or more view synthesis passes, performing the two or more view synthesis passes for the desired synthesized view using only patches belonging to the selected set of views for each pass to provide two or more intermediate view synthesis results, and masking and merging the two or more intermediate view synthesis results to provide a final view synthesis result.

Example 44 includes the method of Example 43, further comprising re-ordering the one or more patches from the plurality of views based on a distance between each view and the desired synthesized view.

Example 45 includes the method of Example 44, further comprising determining overlapped scene coverage information between the plurality of views and the desired synthesized view based on the one or more of relative position and orientation related information, and re-ordering the one or more patches from the plurality of views in an order from a relatively largest overlap to a relatively smallest overlap based on the determined overlapped scene coverage information between the plurality of views and the desired synthesized view.

Example 46 includes the method of any of Examples 43 to 45, further comprising performing two or more of the view synthesis passes in parallel with each other.

Example 47 includes the method of Example 46, further comprising determining one or more of a number of passes and a number of views for the performed view synthesis based on one or more user-provided parameters.

Example 48 includes the method of any of Examples 43 to 47, further comprising generating a binary mask to identify missing information in an intermediate view.

Example 49 includes the method of Example 48, further comprising merging two intermediate view synthesis results based on the binary mask such that missing information is taken from the higher pass intermediate synthesized view and coherent synthesis information is taken from the lower pass intermediate synthesized view, and repeating the merge consecutively for each intermediate synthesized view result.

Example 50 includes at least one machine readable medium comprising a plurality of instructions that, in response to being executed on a computing device, cause the computing device to re-order one or more patches from a plurality of views based on one or more of relative position and orientation related information for a desired synthesized view, select a respective set of views to be used for each of two or more view synthesis passes, perform the two or more view synthesis passes for the desired synthesized view using only patches belonging to the selected set of views for each pass to provide two or more intermediate view synthesis results, and mask and merge the two or more intermediate view synthesis results to provide a final view synthesis result.

Example 51 includes the machine readable medium of Example 50, comprising a plurality of further instructions that, in response to being executed on the computing device, cause the computing device to re-order the one or more patches from the plurality of views based on a distance between each view and the desired synthesized view.

Example 52 includes the machine readable medium of Example 51, comprising a plurality of further instructions that, in response to being executed on the computing device, cause the computing device to determine overlapped scene coverage information between the plurality of views and the desired synthesized view based on the one or more of relative position and orientation related information, and re-order the one or more patches from the plurality of views in an order from a relatively largest overlap to a relatively smallest overlap based on the determined overlapped scene coverage information between the plurality of views and the desired synthesized view.

Example 53 includes the machine readable medium of any of Examples 50 to 52, comprising a plurality of further instructions that, in response to being executed on the computing device, cause the computing device to perform two or more of the view synthesis passes in parallel with each other.

Example 54 includes the machine readable medium of Example 53, comprising a plurality of further instructions that, in response to being executed on the computing device, cause the computing device to determine one or more of a number of passes and a number of views for the performed view synthesis based on one or more user-provided parameters.

Example 55 includes the machine readable medium of any of Examples 50 to 54, comprising a plurality of further instructions that, in response to being executed on the computing device, cause the computing device to generate a binary mask to identify missing information in an intermediate view.

Example 56 includes the machine readable medium of Example 55, comprising a plurality of further instructions that, in response to being executed on the computing device, cause the computing device to merge two intermediate view synthesis results based on the binary mask such that missing information is taken from the higher pass intermediate synthesized view and coherent synthesis information is taken from the lower pass intermediate synthesized view, and repeat the merge consecutively for each intermediate synthesized view result.

Example 57 includes an electronic apparatus, comprising a substrate, and logic coupled to the substrate, the logic to re-order one or more patches from a plurality of views based on one or more of relative position and orientation related information for a desired synthesized view, select a respective set of views to be used for each of two or more view synthesis passes, perform the two or more view synthesis passes for the desired synthesized view using only patches belonging to the selected set of views for each pass to provide two or more intermediate view synthesis results, and mask and merge the two or more intermediate view synthesis results to provide a final view synthesis result.

Example 58 includes the apparatus of Example 57, wherein the logic is further to re-order the one or more patches from the plurality of views based on a distance between each view and the desired synthesized view.

Example 59 includes the apparatus of Example 58, wherein the logic is further to determine overlapped scene coverage information between the plurality of views and the desired synthesized view based on the one or more of relative position and orientation related information, and re-order the one or more patches from the plurality of views in an order from a relatively largest overlap to a relatively smallest overlap based on the determined overlapped scene coverage information between the plurality of views and the desired synthesized view.

Example 60 includes the apparatus of any of Examples 57 to 59, wherein the logic is further to perform two or more of the view synthesis passes in parallel with each other.

Example 61 includes the apparatus of Example 60, wherein the logic is further to determine one or more of a number of passes and a number of views for the performed view synthesis based on one or more user-provided parameters.

Example 62 includes the apparatus of any of Examples 57 to 61, wherein the logic is further to generate a binary mask to identify missing information in an intermediate view.

Example 63 includes the apparatus of Example 62, wherein the logic is further to merge two intermediate view synthesis results based on the binary mask such that missing information is taken from the higher pass intermediate synthesized view and coherent synthesis information is taken from the lower pass intermediate synthesized view, and repeat the merge consecutively for each intermediate synthesized view result.

Example 64 includes an image processing apparatus, comprising means for re-ordering one or more patches from a plurality of views based on one or more of relative position and orientation related information for a desired synthesized view, means for selecting a respective set of views to be used for each of two or more view synthesis passes, means for performing the two or more view synthesis passes for the desired synthesized view using only patches belonging to the selected set of views for each pass to provide two or more intermediate view synthesis results, and means for masking and merging the two or more intermediate view synthesis results to provide a final view synthesis result.

Example 65 includes the apparatus of Example 64, further comprising means for re-ordering the one or more patches from the plurality of views based on a distance between each view and the desired synthesized view.

Example 66 includes the apparatus of Example 65, further comprising means for determining overlapped scene coverage information between the plurality of views and the desired synthesized view based on the one or more of relative position and orientation related information, and means for re-ordering the one or more patches from the plurality of views in an order from a relatively largest overlap to a relatively smallest overlap based on the determined overlapped scene coverage information between the plurality of views and the desired synthesized view.

Example 67 includes the apparatus of any of Examples 64 to 66, further comprising means for performing two or more of the view synthesis passes in parallel with each other.

Example 68 includes the apparatus of Example 67, further comprising means for determining one or more of a number of passes and a number of views for the performed view synthesis based on one or more user-provided parameters.

Example 69 includes the apparatus of any of Examples 64 to 68, further comprising means for generating a binary mask to identify missing information in an intermediate view.

Example 70 includes the apparatus of Example 69, further comprising means for merging two intermediate view synthesis results based on the binary mask such that missing information is taken from the higher pass intermediate synthesized view and coherent synthesis information is taken from the lower pass intermediate synthesized view, and means for repeating the merge consecutively for each intermediate synthesized view result.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An apparatus to merge camera views, comprising:
at least one memory;
machine readable instructions; and
processor circuitry to execute the machine readable instructions to at least:
order a plurality of views based on (a) a target synthesized view and (b) parameters corresponding to the target synthesized view;
generate a first intermediate view synthesis result corresponding to a first one of the ordered plurality of views;
generate a second intermediate view synthesis result corresponding to a second one of the ordered plurality of views;
mask the first intermediate view synthesis result with a first mask; and
generate a final view synthesis result by merging the second intermediate view synthesis result with an output of the first mask.

2. The apparatus as defined in claim 1, wherein the parameters include distance information, the processor circuitry to arrange the order of the plurality of views based on a distance between respective ones of the plurality of views.

3. The apparatus as defined in claim 1, wherein the parameters of the target synthesized view include (a) position information and (b) orientation information.

4. The apparatus as defined in claim 1, wherein the processor circuitry is to identify a degree of overlap between (a) the first one of the ordered plurality of views and the target synthesized view and (b) the second one of the ordered plurality of views and the target synthesized view.

5. The apparatus as defined in claim 4, wherein the processor circuitry is to order the plurality of views based on one of the first one of the ordered plurality of views or the second one of the ordered plurality of views having a greater one of the degree of overlap.

6. The apparatus as defined in claim 1, wherein the processor circuitry is to generate additional intermediate view synthesis results based on at least one of (a) a number of cameras corresponding to the plurality of views or (b) a number of positions of the cameras.

7. The apparatus as defined in claim 1, wherein the plurality of views includes at least one of orthogonal position information or yaw-pitch-roll orientation information.

8. At least one machine readable storage device or storage disk comprising instructions that, when executed by processor circuitry, cause the processor circuitry to at least:
order a plurality of views based on (a) a target synthesized view and (b) parameters corresponding to the target synthesized view;
generate a first intermediate view synthesis result corresponding to a first one of the ordered plurality of views;
generate a second intermediate view synthesis result corresponding to a second one of the ordered plurality of views;
mask the first intermediate view synthesis result with a first mask; and generate a final view synthesis result by merging the second intermediate view synthesis result with an output of the first mask.

9. The machine readable storage device or storage disk as defined in claim 8, wherein the instructions, when executed, cause the processor circuitry to arrange the order of the plurality of views based on a distance between respective ones of the plurality of views.

10. The machine readable storage device or storage disk as defined in claim 8, wherein the instructions, when executed, cause the processor circuitry to identify the parameters of the target synthesized view as at least one of (a) position information and (b) orientation information.

11. The machine readable storage device or storage disk as defined in claim 8, wherein the instructions, when executed, cause the processor circuitry to identify a degree of overlap between (a) the first one of the ordered plurality of views and the target synthesized view and (b) the second one of the ordered plurality of views and the target synthesized view.

12. The machine readable storage device or storage disk as defined in claim 11, wherein the instructions, when executed, cause the processor circuitry to order the plurality of views based on one of the first one of the ordered plurality of views or the second one of the ordered plurality of views having a greater one of the degree of overlap.

13. The machine readable storage device or storage disk as defined in claim 8, wherein the instructions, when executed, cause the processor circuitry to generate additional intermediate view synthesis results based on at least one of (a) a number of cameras corresponding to the plurality of views or (b) a number of positions of the cameras.

14. The machine readable storage device or storage disk as defined in claim 8, wherein the instructions, when executed, cause the processor circuitry to identify at least one of orthogonal position information or yaw-pitch-roll orientation information in the plurality of views.

15. An apparatus to merge camera views, comprising:
views reordering circuitry to order a plurality of views based on (a) a target synthesized view and (b) parameters corresponding to the target synthesized view;
multi-pass view circuitry to:
generate a first intermediate view synthesis result corresponding to a first one of the ordered plurality of views; and
generate a second intermediate view synthesis result corresponding to a second one of the ordered plurality of views;
masking circuitry to mask the first intermediate view synthesis result with a first mask; and
merging circuitry to generate a final view synthesis result by merging the second intermediate view synthesis result with an output of the first mask.

16. The apparatus as defined in claim 15, wherein the views reordering circuitry is to arrange the order of the plurality of views based on a distance between respective ones of the plurality of views.

17. The apparatus as defined in claim 15, wherein the parameters of the target synthesized view include (a) position information and (b) orientation information.

18. The apparatus as defined in claim 15, wherein the views reordering circuitry is to identify a degree of overlap between (a) the first one of the ordered plurality of views and the target synthesized view and (b) the second one of the ordered plurality of views and the target synthesized view.

19. The apparatus as defined in claim 18, wherein the views reordering circuitry is to order the plurality of views based on one of the first one of the ordered plurality of views or the second one of the ordered plurality of views having a greater one of the degree of overlap.

20. The apparatus as defined in claim 15, wherein the multi-pass view circuitry is to generate additional intermediate view synthesis results based on at least one of (a) a number of cameras corresponding to the plurality of views or (b) a number of positions of the cameras.

21. The apparatus as defined in claim 15, wherein the plurality of views includes at least one of orthogonal position information or yaw-pitch-roll orientation information.

* * * * *